(12) United States Patent
Grecu et al.

(10) Patent No.: US 10,694,603 B1
(45) Date of Patent: Jun. 23, 2020

(54) LED DRIVER CIRCUIT

(71) Applicant: Apple Inc., Cupertino, CA (US)

(72) Inventors: Cristian Grecu, Munich (DE);
Bogdan-Eugen Matei, Munich (DE);
Angelo Bassi, Munich (DE);
Andrei-Cosmin Gaidam, Munich (DE); Alessandro Molari, Eichenau (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/684,567

(22) Filed: Nov. 14, 2019

(51) Int. Cl.
*H05B 45/10* (2020.01)
*H05B 45/37* (2020.01)
*H05B 45/44* (2020.01)

(52) U.S. Cl.
CPC ............. *H05B 45/37* (2020.01); *H05B 45/10* (2020.01); *H05B 45/44* (2020.01)

(58) Field of Classification Search
CPC ........ H05B 45/10; H05B 45/20; H05B 45/37; H05B 45/44; H05B 45/46; H05B 47/10; Y02B 20/346; H02M 3/156; H02M 3/33507; G09G 2320/0646; G09G 2330/02; G09G 2330/021; F21Y 2115/10
See application file for complete search history.

(56) References Cited

U.S. PATENT DOCUMENTS

| 6,825,619 | B2* | 11/2004 | Norris | A61B 5/14552 |
| | | | | 315/149 |
| 7,821,491 | B2 | 10/2010 | Tanaka | |
| 8,373,348 | B2 | 2/2013 | Liu et al. | |
| 8,390,262 | B2* | 3/2013 | Chang | H05B 45/37 |
| | | | | 323/282 |
| 8,477,516 | B2* | 7/2013 | Chien | H02M 3/33507 |
| | | | | 363/21.16 |
| 8,648,545 | B2* | 2/2014 | Lee | H05B 45/37 |
| | | | | 315/291 |
| 8,710,753 | B2 | 4/2014 | Kim et al. | |
| 8,907,584 | B2 | 12/2014 | Lim et al. | |
| 10,004,117 | B2* | 6/2018 | Wang | H05B 45/10 |

* cited by examiner

*Primary Examiner* — Haissa Philogene
(74) *Attorney, Agent, or Firm* — Kowert, Hood, Munyon, Rankin & Goetzel, P.C.; Erik A. Heter

(57) ABSTRACT

An LED driver circuit is disclosed. The LED driver circuit includes an amplifier having a first input coupled to receive a reference voltage and a second input coupled to receive a feedback voltage. The circuit further includes first and second transistors each having respective gate terminals coupled to an output of the first amplifier. In a first mode, a first switch alternately couples a source terminal of the first transistor to the second input of the amplifier (when the pulse is asserted) and a source terminal of the second transistor to the second input (when the pulse is de-asserted). A third transistor includes a gate terminal that is coupled to ground, by a second switch, when operating in the first mode. When operating in the second mode, the switch couples the third transistor to the output of the amplifier, while the pulse remains asserted.

20 Claims, 6 Drawing Sheets

LED DRIVER CIRCUIT

BACKGROUND

Technical Field

This disclosure is directed to electronic circuits, and more particularly, to driver circuits.

Description of the Related Art

Light emitting diodes (LEDs) are used in a wide variety of modern electronic devices. One common use of LEDs is backlighting for liquid crystal displays. A backlight may be formed of a number of LED strings and supplied from, e.g., a local boost converter. The LEDs within a string may be connected to one another in series.

During operation, the LEDs may be fully on when the display of which the backlight is part is in use. When the display is not in use, the LEDs may be dimmed. Control of the LEDs in both their fully on and dimmed states may be conducted under the control of correspondingly coupled LED driver circuits.

SUMMARY

An LED driver circuit is disclosed. In one embodiment, the LED driver circuit includes an amplifier having a first input coupled to receive a reference voltage and a second input coupled to receive a feedback voltage. The circuit further includes first and second transistors each having respective gate terminals coupled to an output of the first amplifier. In a first mode, a first switch alternately couples a source terminal of the first transistor to the second input of the amplifier (when the pulse is asserted) and a source terminal of the second transistor to the second input (when the pulse is de-asserted). A third transistor includes a gate terminal that is coupled to ground, by a second switch, when operating in the first mode. When operating in the second mode, the switch couples the third transistor to the output of the amplifier, while the pulse remains asserted.

In one embodiment, the LED driver circuit further includes a fourth transistor having a source terminal coupled to a drain of the first transistor. The drains of the third and fourth transistors are each coupled to an LED drive node, to which the cathode of at least one LED may be coupled. During the first mode, the fourth transistor may become active responsive to receiving a pulse, and thus both the first and fourth transistors may drive the one or more LEDs coupled (e.g., in series) to the LED drive node for the duration of the pulse. The third transistor is inactive during operation in the first mode, with its gate terminal coupled to a ground node. In the second mode, the third transistor is active, along with the first and fourth transistors (since the pulse remains asserted), thereby providing a constant current that results in LEDs coupled to the circuit being continuously in the on state.

BRIEF DESCRIPTION OF THE DRAWINGS

The following detailed description makes reference to the accompanying drawings, which are now briefly described.

Figure 1:
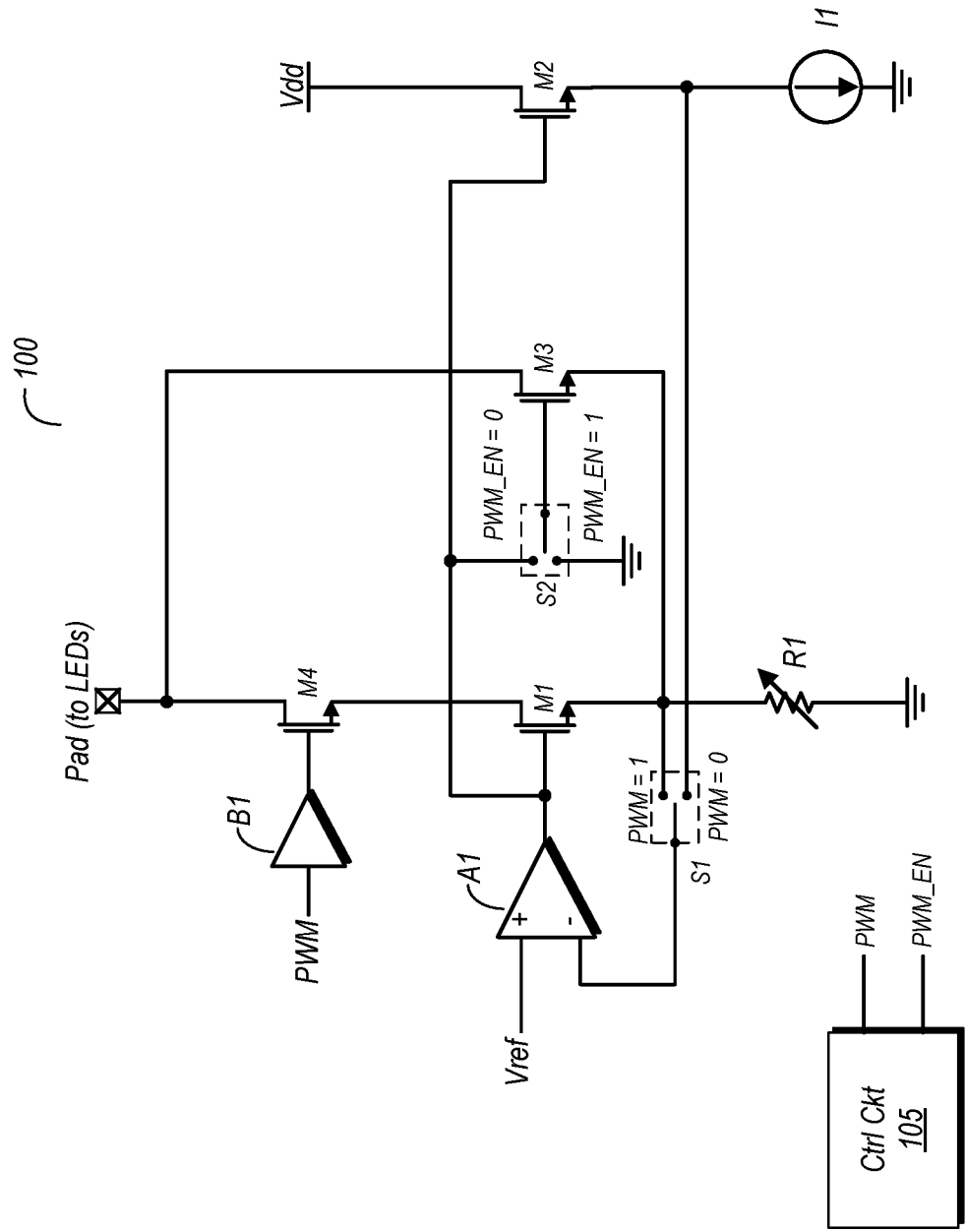
FIG. 1 is a schematic diagram of one embodiment of an LED driver circuit.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry, that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to an LED driver circuit that may, among other applications, be used in a backlight of a display such as a liquid crystal display (LCD). When used in such a display, the apparent brightness produced by the LEDs may depend on the mode of operation. To dim the LEDs below a maximum brightness level, the driver circuit may operate in a pulse width modulation (PWM) mode, where the apparent brightness of the LEDs may vary with the width of the received pulses. For maximum brightness, the LED driver circuit may provide DC operation.

The LED driver circuit of the present disclosure may operate in order to meet a number of different parameters. In various embodiments, the LED driver circuit of the present disclosure may sink a substantially a minimum value of current independent of the circuit output voltage. The circuit may also exhibit low drop-out behavior that may minimize wasted power. Furthermore, the driver circuit of the present disclosure may be designed to provide a high ratio between the minimum and maximum current. When operating in a PWM mode, the circuit may exhibit a very fast turn-on and turn-off response. A low quiescent current may also be achieved by the LED driver circuit of the present disclosure. The circuit may also exhibit a low mismatch on a sample-to-sample basis.

As disclosed herein, the LED driver circuit includes first and second transistors each having respective gate terminals coupled to an output of an amplifier. The amplifier includes a first input coupled to receive a reference voltage, and a second input coupled to receive, via a first switch, a feedback voltage. Responsive to receiving a pulse when operating in the first mode (which may be referred to as the pulse width modulation, or PWM mode), a source terminal of the first transistor is coupled to the second input of the amplifier, via the first switch. Accordingly, the first transistor, when active in the first mode, regulates the output current of the circuit, with the feedback voltage depending on the gate-source voltage of the first transistor. During operation in the first mode, the first switch may also couple the source terminal of the second transistor to the second input of the amplifier (while decoupling the source terminal of the first transistor) when no pulse is received. Thus, the second transistor may regulate the current through the circuit in the absence of a pulse during operation in the PWM mode. Generally speaking, the first switch may alternate between coupling the respective source terminals of the first and second transistors to the second input of the amplifier, with the amount of time for each depending on the width of the respective pulses received.

In the second mode (which may also be referred to as a continuous mode), the pulse remains asserted, and thus the source terminal of the first transistor may also remain coupled to the second input of the amplifier. Additionally, a third transistor may also be activated. The first and third transistors (along with a fourth transistor, discussed below) draw a substantially continuous current through the circuit, which may also be the maximum amount of current through the circuit. Various embodiments of an LED driver circuit in accordance with the above are now discussed in more detail.

FIG. 1 is a schematic diagram of one embodiment of an LED driver circuit. In the embodiment shown, LED driver circuit 100 includes an amplifier A1 having first and second inputs. The first input to A1 (which is a non-inverting input in this embodiment) is a reference voltage that may be generated by any suitable reference voltage generation circuit (e.g., a bandgap circuit). The second input to A1 (which is an inverting input in this embodiment) is coupled to receive a feedback voltage via switch S1. The output terminal of amplifier A1 is coupled to respective gate terminals of transistors M1 and M2, and is also coupled to switch S2. A source terminal of transistor M1 is coupled to a resistor R1. As shown here, resistor R1 may be a variable resistor, or, alternatively, may be a trimmed resistor. A source terminal of transistor M2 is coupled to a current source I1. This current source may be implemented using any suitable type of current sourcing circuitry.

Transistor M3 has a gate terminal coupled to switch S2. Depending on the position of this switch (which, in turn, depends on the operational mode), the gate terminal of transistor M3 may be coupled to either the output of amplifier A1, or to ground. The source terminal of M3 is coupled to the source terminal of M1. A fourth transistor, M4, includes a source terminal coupled a drain terminal of transistor M1. The gate terminal of transistor M4 in this embodiment is coupled to an optional buffer B1, which in turn is coupled to receive a pulse, indicated here as PWM. The source terminals of both transistor M3 and M4 are coupled to an output pad which in turn, may be coupled to a cathode of an LED that may be part of a series-coupled string of LEDs.

Control of the particular mode of operation may be performed by control circuit 105, which is shown here as providing the pulse, PWM, and the PWM_EN control signal (or enable signal) as outputs. The pulse may be received by buffer B1 and switch S1, while the enable signal, PWM_EN, may be received by switch S2. Embodiments are possible and contemplated where no buffer is present, and thus the PWM pulse signal is provided directly to the gate terminal of M4. To operate in the first mode, control circuit 105 asserts the PWM_EN signal (which causes M3 to be turned off) and then provides pulses from its PWM output, with the pulses modulated in width (duration) to control the apparent brightness of the LEDs. To operate in the second mode, control circuit de-asserts the PWM_EN signal, and holds the PWM output as asserted (PWM=1 in the embodiment shown). When PWM_EN is de-asserted, transistor M3 is turned on, while both M1 and M4 are also active. This results in a substantially constant current through this device, resulting in the LEDs being in a continuous on state.

Switch S1 in the embodiment shown is arranged to provide one of two inputs to the second input of amplifier A1. Responsive to receiving a pulse (PWM=1) when operating in a first mode, the PWM mode, switch S1 is coupled to the source terminal of M1. When no pulse is received, or when operating in the second mode, the source terminal of transistor M1 is decoupled from the second input of A1, which switch S1 being in the PWM=0 position. Instead, when PWM=0, the source terminal of M2 is coupled to the second input of amplifier A1. Additionally, switch S2 operates to couple the gate terminal of M3 to ground during operation in the PWM mode (when PWM_EN=1), and couples the gate terminal of M3 to the output of amplifier A1 during operation in the non-PWM (continuous) mode (when PWM_EN=0). When operating in the second mode, control circuit 105 provides PWM as a persistently asserted signal, (PWM=1).

One or two current paths may be provided from a cathode of a coupled LED to ground, depending on the mode of operation. A first of these current paths is through transistors M1 and M4, which is created during operation in PWM mode and in response to receiving a pulse, as both M1 and M4 may be active for the duration of each pulse. The second current path is added, through transistor M3, during operation in the second mode. Both of these paths converge at the junction of the source terminals of M1 and M3 and the correspondingly coupled terminal of R1, which is further coupled to the ground node as shown. During operation in the first mode, when no pulse is received (PWM=0), no current path provided between the pad and ground.

Switch S2, in this embodiment, couples the gate terminal of M3 to the output of amplifier A1, when PWM_EN=0. As noted above, when M3 is activated, a second current path between the pad (which may also referred to as the drive node) and ground is added. This ensures that substantially constant current is flowing from the drive node or pad coupled to the LEDs during operation in the non-PWM mode, and may result in a continuous on state for the LEDs. With two parallel current paths active, the amount of current drawn by driver circuit 100 during operation in the second mode.

During operation in the first mode and in the absence of a pulse (PWM=0), transistor M2 substantially controls the output voltage from amplifier A1. In particular, transistor M2 and amplifier A1 form a loop, with the output voltage of A1 provided to the gate of M2, while the source voltage of M2 is provided to the inverting (second) input of A1. Accordingly, amplifier A1 continues to provide an output signal during PWM mode operation when no pulse is asserted. This may allow for fast turn-on time when transitioning from PWM=0 to PWM=1.

LED driver circuit 100 has shown in FIG. 1 may be thought of as having two separate control loops for controlling the current in the circuit. The first control loop may thus include the transistors M1 and M4, along with amplifier A1. This loop may be activated responsive to receiving a pulse during operation in the PWM mode, which causes switch S1 to be set to the position indicated as PWM=1. The second control loop includes transistor M2 and amplifier A1, and is active when switch S1 is set to PWM=0, as described above.

Figure 2:
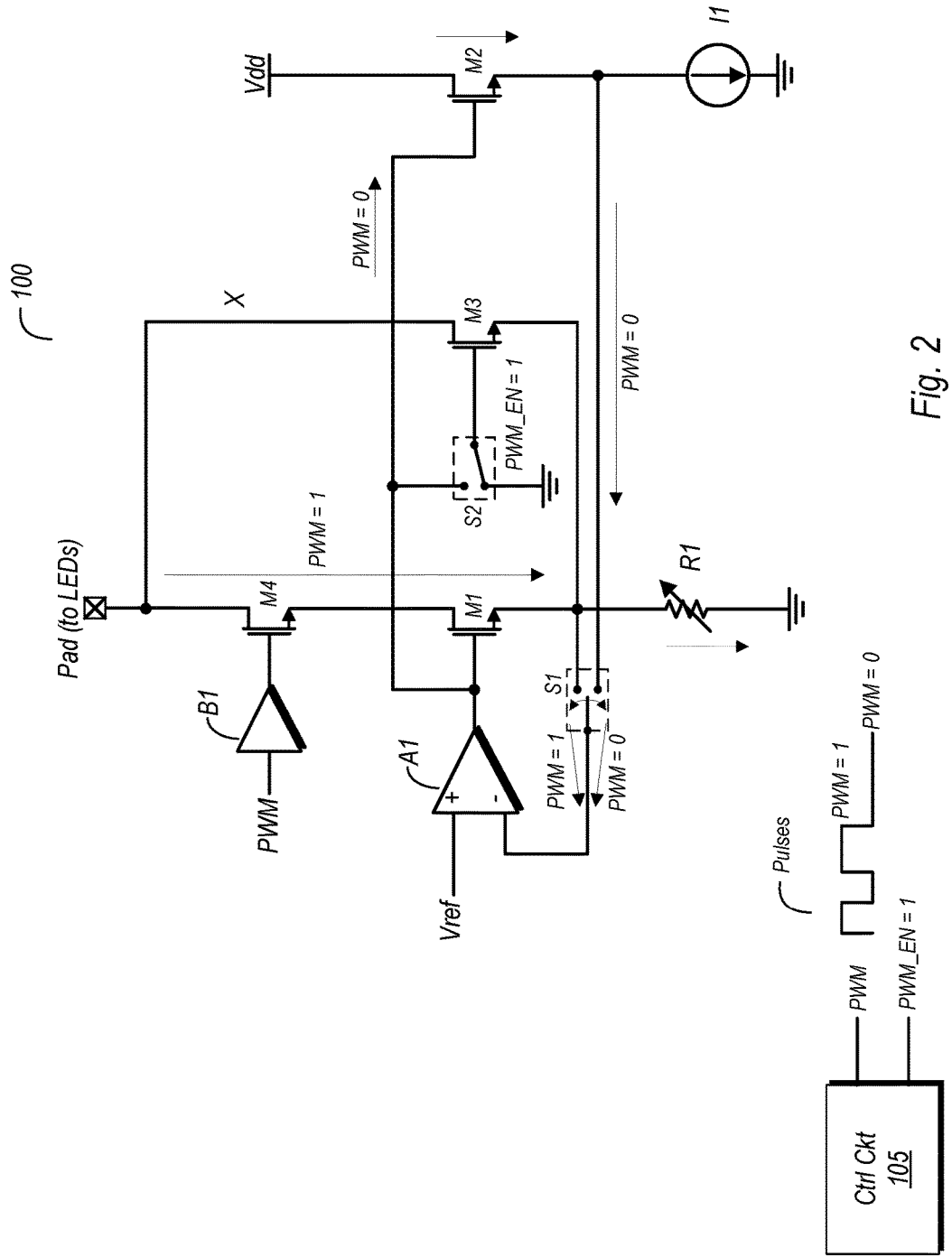
FIG. 2 is a schematic diagram illustrating operation of one embodiment an LED driver circuit in a first mode of operation.

FIG. 2 is a schematic diagram illustrating operation of one embodiment an LED driver circuit in a first mode of operation, alternatively referred to as the PWM mode. In the PWM mode of operation, the PWM_EN signal may be asserted to a value of 1, which in this embodiment, causes the gate terminal of transistor M3 to be coupled to a ground node. This causes M3 to be inactive in this mode, thereby reducing the loading on the output of amplifier A1 when pulses are received.

During the PWM mode, the position of switch S1 is dependent upon receiving pulses. When a pulse is received, the switch may be in the PWM=1 position, as shown in the drawing, and the source of M1 is coupled to the inverting input of A1. When no pulse is currently received, switch S1 may be in the opposite position, with the source of M1 being decoupled from the inverting input of A1.

With switch S1 in the PWM=1 position, the voltage on the output of amplifier A1 may rise and turn on M1. The pulse may also be received by the gate terminal of M4 via buffer B1. This may activate transistor M4. With both transistors M1 and M4 active, a current path is provided between the LED drive node/pad, through both of these devices and resistor R1. Additionally, a loop is performed by A1 and M1, with the source of M1 providing the feedback voltage to the inverting input of A1. Accordingly, transistor M1 regulates the current in the current path through M1 and M4. By providing transistor M4 in this embodiment, the cascode circuit structure reduces limits the swing of the drain voltage of M1 from the state of PWM=0 to PWM=1. Furthermore, since the swing of the M1 drain voltage is limited between a pulse and no pulse, a fast responding amplifier is not required for the implementation of A1.

When switch S1 is in the PWM=0 position during operation in the PWM mode, the source terminal of M2 is coupled to the inverting input of amplifier A1. This forms a control loop with A1 and M2. Therefore, the output voltage of A1 is dependent upon the source voltage of M2 at this time. The presence of M2 in the embodiment shown ensures that driver circuit 100 performs closed loop operation irrespective of the mode of operation or whether a pulse is presently received. As noted above, when in the PWM or mode and when a pulse is received, a loop is formed by M1 and A1. When no pulse is currently received in the PWM mode, the loop is formed by M2 and A1.

Figure 3:
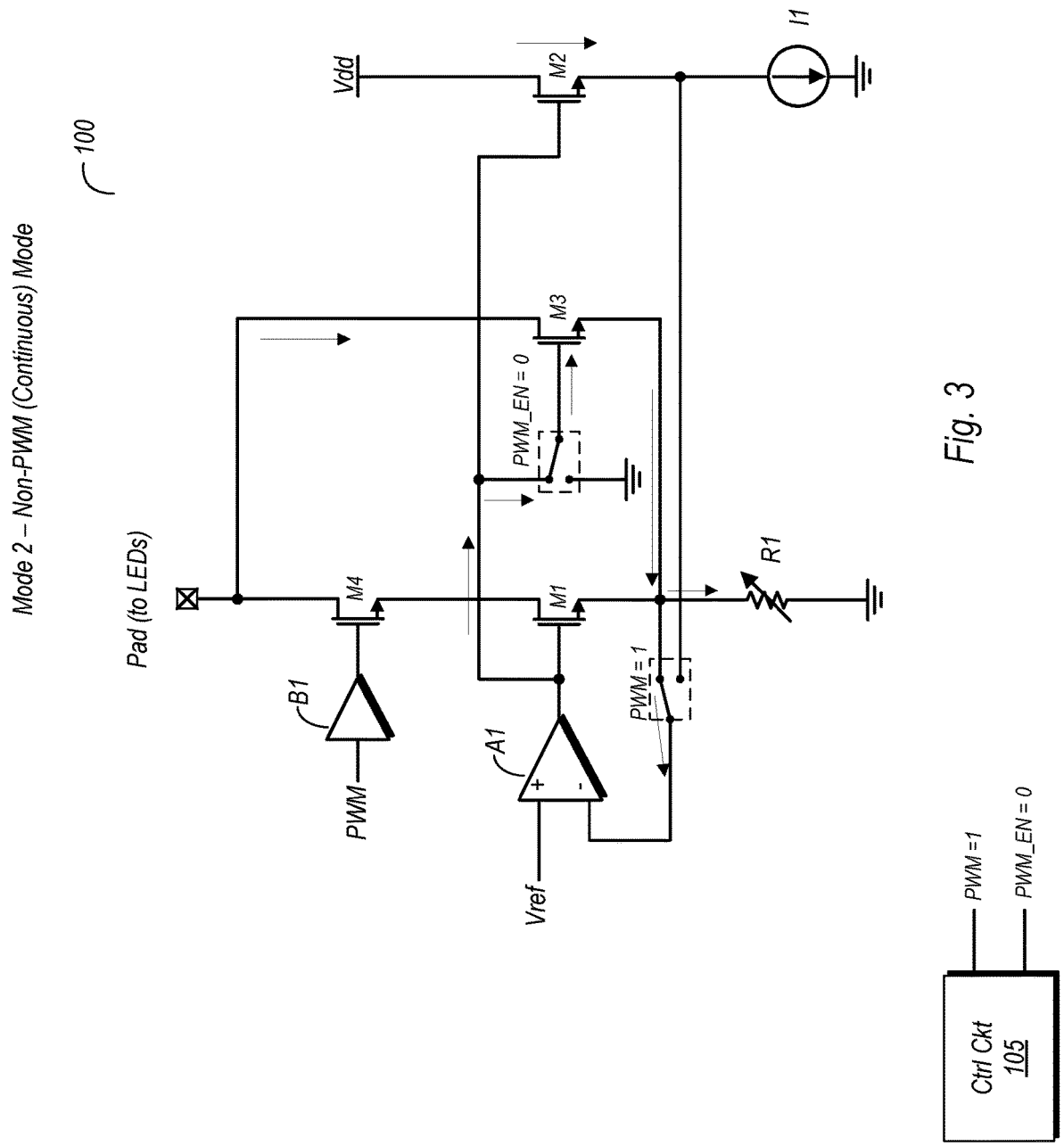
FIG. 3 is a schematic diagram illustrating operation of one embodiment an LED driver circuit in a second mode of operation.

FIG. 3 is a schematic diagram illustrating operation of one embodiment an LED driver circuit in a second mode of operation. This second mode of operation may be referred to herein either as the non-PWM mode of operation or the continuous mode of operation. When operating in this mode, switch S1 remains in the PWM=1 position Accordingly, M4 remains active in this mode, while the source of M1 remains coupled to the inverting input of amplifier A1, via switch S1.

Switch S2 in this mode of operation is in the PWM_EN=0 position. This results in the gate terminal of M3 being coupled to the output of amplifier A1. As a result, M3 is activated and provides a second current path, from the pad, through the device, to resistor R1. Accordingly, during operation in the second mode, there are two active, parallel current paths between the pad and R1, the first being through M4 and M1, the second being through M3. This may result in a substantially continuous, maximum current between the pad and R1 (and thus through R1 to ground as well). As a result, a string of LEDs coupled to LED driver circuit 100 may remain continuously on at their maximum brightness. Transistor M3 may be implemented as a large transistor to help attain the maximum current.

Figure 4:
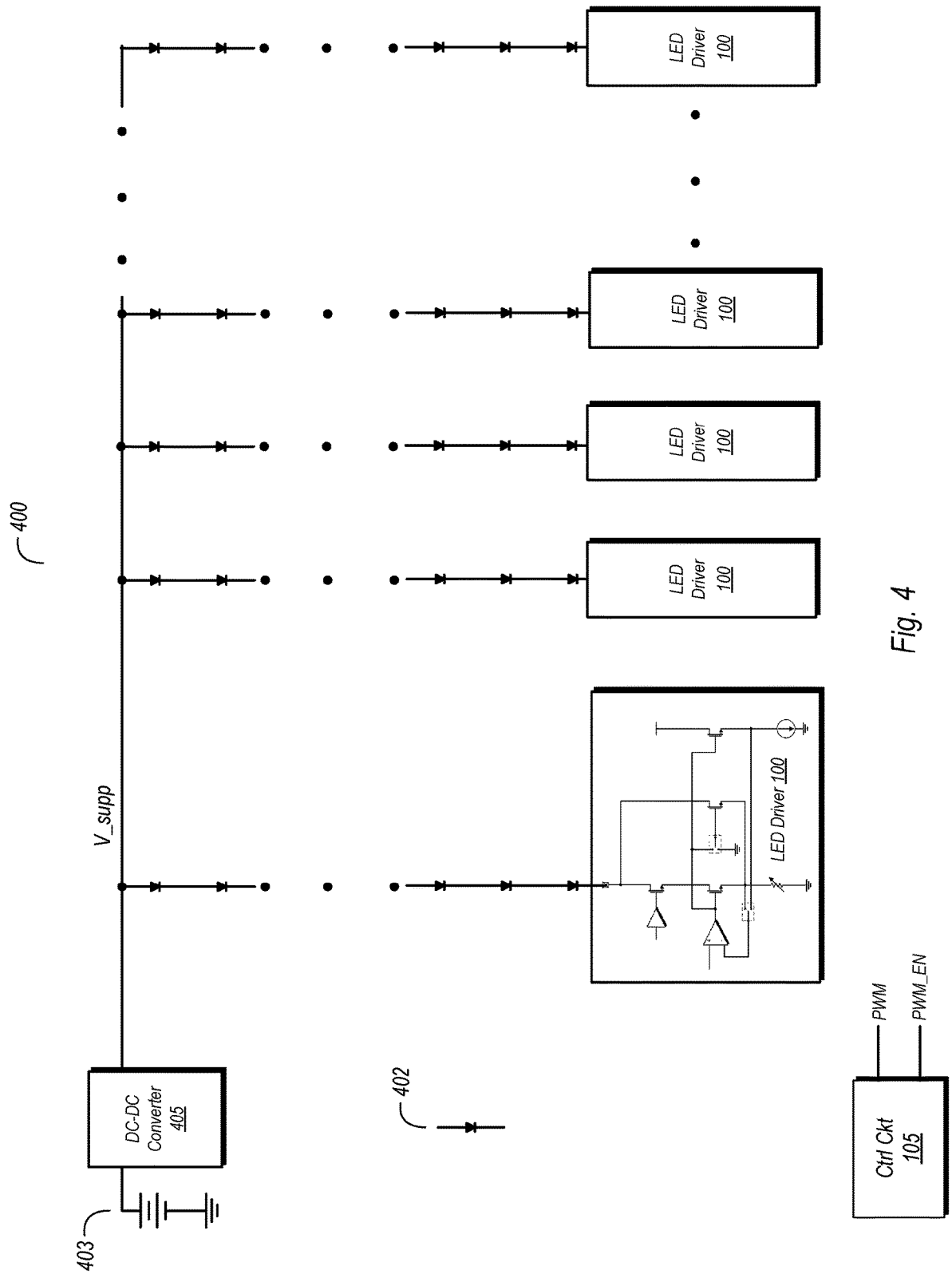
FIG. 4 is a schematic diagram illustrating one embodiment of a backlight assembly.

FIG. 4 is a schematic diagram illustrating one embodiment of a backlight assembly. In the embodiment shown, backlight assembly 400 includes M strings of N LEDs 402, wherein M and N are integer numbers. Each of the strings of series-coupled LEDs is coupled to corresponding one of a number of LED driver circuit 100. Control circuit 105 in the embodiment shown is coupled to provide both a pulse (PWM) and an enable signal (PWM_EN) to each of the LED driver circuits 100.

In each of the strings of series coupled LEDs, a cathode of a last one of the LEDs is coupled to a pad/drive node of the corresponding LED driver circuit 100. An anode of a first one of the LEDs in each of the M strings is coupled to a voltage supply node, V_supp, which is the output of DC-DC converter 405. In one embodiment, DC-DC converter 405 is a boost converter that provides an output voltage, on the voltage supply node, that is greater than an input voltage. In this embodiment, the input voltage to DC-DC converter 405 is received from battery 403.

The brightness of the backlight formed by the circuit shown in FIG. 4 may be at its highest intensity when operating in the non-PWM/continuous mode. In this mode, each of the LEDs 402 is continuously on, with each of the LED driver circuits 100 drawing its maximum current through the parallel current paths of M1/M4 and the relatively large device M3 as discussed above in reference to FIGS. 1-3.

To dim the apparent brightness of the backlight, control circuit 105 may cause the circuit to enter the PWM mode. Pulses, from the PWM output of control circuit 105, may then be applied to each of the LED driver circuits 100. The overall apparent brightness provided by backlight assembly may vary with the duty cycle of the pulses. Higher duty cycles may result in a greater brightness. To dim the backlight, the duty cycle of the pulses may be reduced to a level that corresponds to the desired brightness. With lower duty cycles, the LEDs 402 spend less time on and a greater time off, which may cause a user to perceive a lower level of brightness relative to higher duty cycles or when the backlight assembly 400 is operated in continuous mode (with the LEDs 402 continuously on).

The LED driver circuits of the present disclosure may sink at least a minimum amount of current independent of the output voltage of amplifier A1. In some embodiments, the current through transistors M1 and M4 may be substantially constant when a pulse is being received in the PWM mode.

The LED driver circuit of the present disclosure may also have a low drop out, due to the presence of transistor M3. It is noted that the gate capacitance of M3 is not an issue when operating in the PWM mode, since the gate is not connected to the output of amplifier A1 at this time. The presence of M3 may also ensure a high ratio between the minimum and maximum current drawn by the circuit. The maximum current may be drawn by the parallel current paths through M1/M4 and M3 in the continuous mode. In the PWM mode, M3 is off, M1 and M4 may draw current when active responsive to receiving a pulse. When no pulse is received, a minimum amount of current may nevertheless pass through these devices due to sub-threshold operation.

Since the cascode structure in the circuit reduces the voltage swing on the drain of M1, the LED driver circuit 105 of the present disclosure may exhibit very fast turn on and turn off when operating in the PWM mode. The low voltage swing on the M1 drain also reduces the need for amplifier A1 to be a fast responding amplifier.

The presences of M2 in LED driver circuit 100 may ensure that, irrespective of the mode of operation or whether a pulse is currently received, the circuit also provides closed loop operation. This may enable the use of closed-loop offset canceling techniques, such as auto-zero, to be used to minimize the mismatch from one sample to the next.

Figure 5:
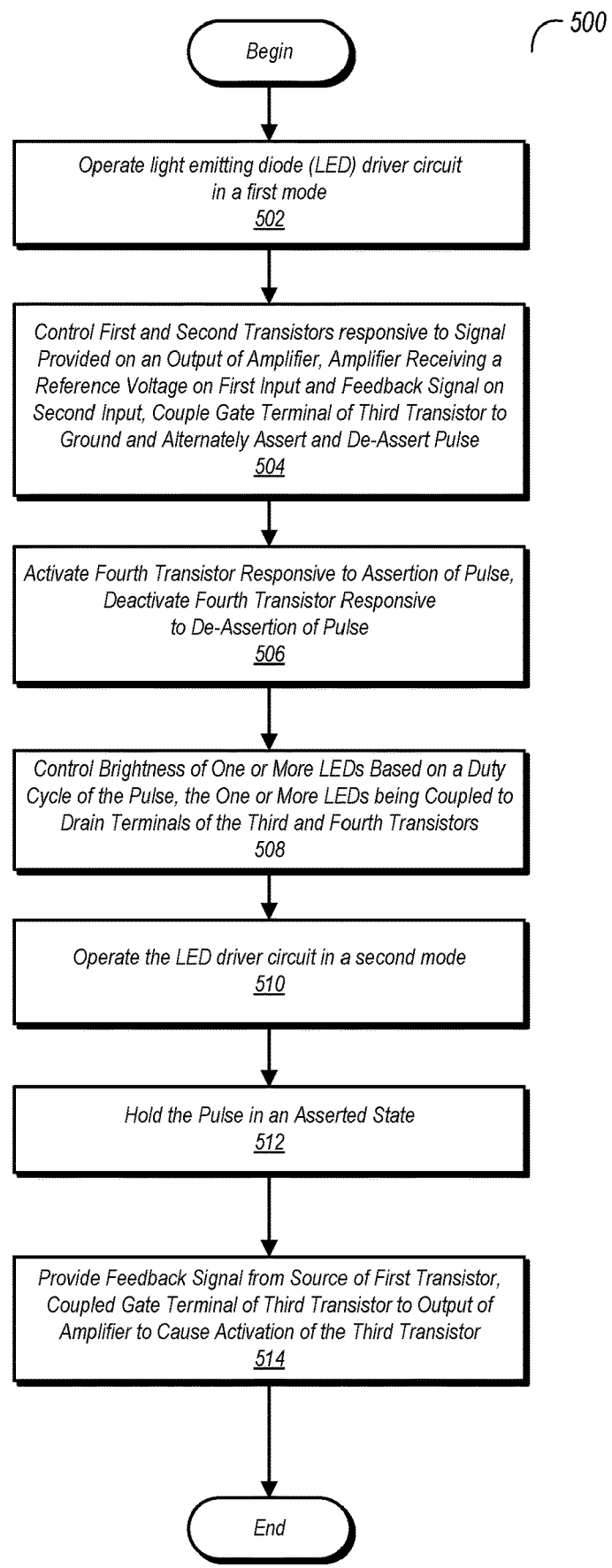
FIG. 5 is a flow diagram illustrating one embodiment of a method for operating an LED driver circuit.

FIG. 5 is a flow diagram illustrating one embodiment of a method for operating an LED driver circuit. Method 500 may be performed with various embodiments of the LED driver circuit discussed above with reference to FIGS. 1-4. Embodiments not explicitly discussed herein, but capable of performing method 500, may also fall within the scope of this disclosure.

Method 500 begins with operating a light emitting diode (LED) driver circuit in a first mode (block 502). Operating in the first mode includes controlling first and second transistors responsive to a signal provided on an output of an amplifier, the amplifier receiving a reference voltage on a first input and a feedback signal on a second input, coupling a gate terminal of a third transistor to a ground node while alternately asserting and de-asserting a pulse (block 504). First mode operation further includes activating a fourth transistor responsive to assertion of the pulse and de-activating the fourth transistor responsive to de-assertion of the pulse (block 506). This results in controlling a brightness of one or more LEDs based on a duty cycle of the pulse, the one or more LEDs being coupled to drain terminals of the third and fourth transistors (block 508).

Method 500 further includes operating the LED driver circuit in a second mode (block 510). Operating in the second mode includes holding the pulse in an asserted state (block 512). Second mode operation further includes providing the feedback signal from the source of the first transistor and coupling a gate terminal of the third transistor to the output of amplifier to cause activation of the third transistor (block 514).

In various embodiments, the method includes during operation in the first mode, a first switch causing a source terminal of the first transistor to be coupled to the second input responsive to assertion of the pulse, and causing causes a source terminal of the second transistor to be coupled to the second input responsive to de-assertion of the pulse. The method may also include, when operating in the second mode, a second switch coupling a gate terminal of the third transistor to the ground node during operation in the first mode and further comprising the second switch coupling the gate terminal of the third transistor to the output of the amplifier. When operating in the first mode, the method includes varying an amount of current through the one or more LEDs, while causing a continuous current through the LEDs when operating in the second mode.

Figure 6:
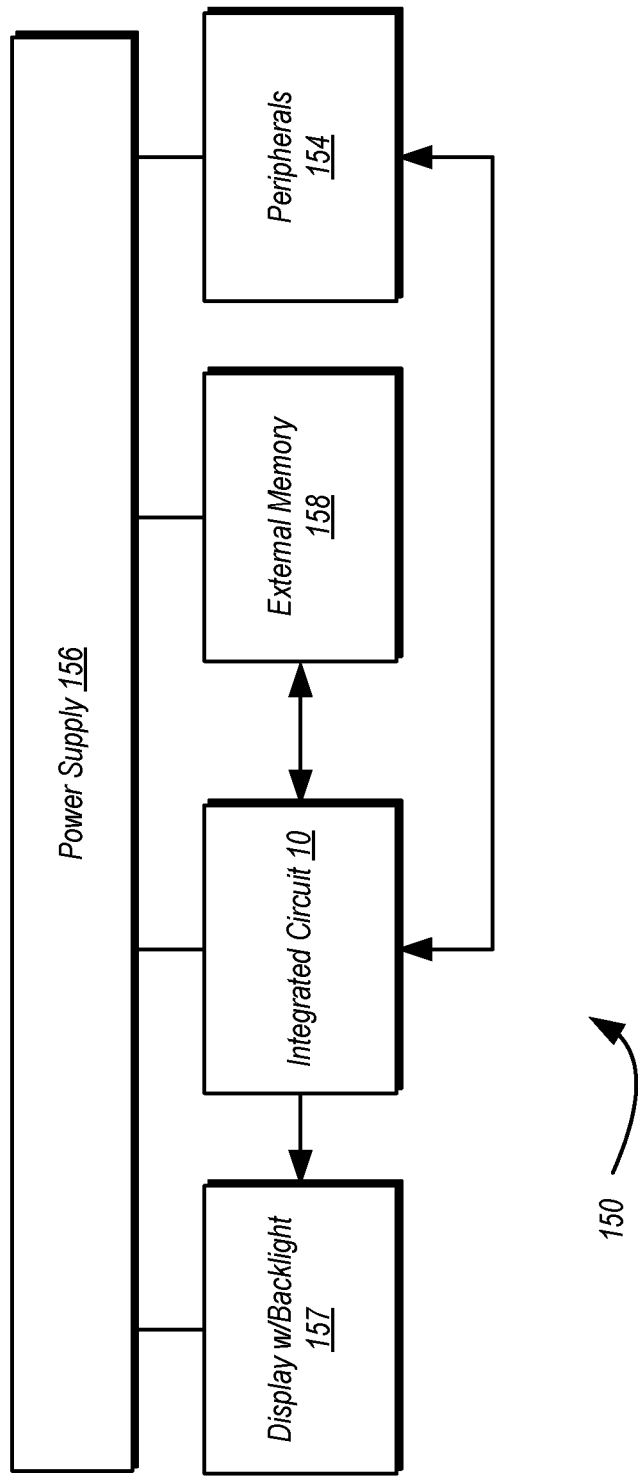
FIG. 6 is a block diagram of one embodiment of an example system.

Turning next to FIG. 6, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

System 150 in the embodiment shown also includes at least one instance of a display 157, the display including a backlight. The backlight portion of display 157 may be implemented in accordance with the example shown in FIG. 4, and may include a DC-DC converter (e.g., a boost converter), N strings of M LEDs (where M and N are integer values), and corresponding instances of an LED driver circuit, such as those illustrated in FIGS. 1-3.

Numerous variations and modifications will become apparent to those skilled in the art once the above disclosure is fully appreciated. It is intended that the following claims be interpreted to embrace all such variations and modifications.

What is claimed is:

1. A circuit comprising:
    an amplifier having a first input coupled to receive a reference voltage and a second input coupled to receive a feedback voltage;
    first and second transistors each having respective gate terminals coupled to an output of the first amplifier;
    a first switch configured to, in a first mode, couple a source terminal of the first transistor to the second input of the amplifier responsive to receiving a pulse, and couple a source terminal of the second transistor to the second input of the amplifier in an absence of the pulse;
    a third transistor having a source terminal coupled to a source terminal of the first transistor; and
    a second switch configured to, in a second mode, couple a gate terminal of the third transistor to the output of the amplifier, and, in the first mode, couple the gate terminal of the third transistor to a ground node.

2. The circuit of claim 1, further comprising a fourth transistor having a drain terminal coupled to a drain terminal of the third transistor.

3. The circuit of claim 2, wherein a source terminal of the fourth transistor is coupled to a drain terminal of the first transistor.

4. The circuit of claim 2, further comprising a buffer circuit configured to receive the pulse from a control circuit, wherein an output of the buffer is coupled to a gate terminal of the fourth transistor.

5. The circuit of claim 4, wherein the first switch is coupled to receive the pulse from the control circuit and wherein the second switch is configured to receive an enable signal from the control circuit, wherein the control signal is configured to assert the enable signal to enable operation in the first mode and to de-assert the enable signal to cause the circuit to operate in the second mode, wherein a gate terminal of the third transistor is coupled to the ground node responsive to assertion of the enable signal.

6. The circuit of claim 4, wherein the fourth transistor is configured to be active responsive to receiving the pulse, wherein the pulse is alternately asserted and de-asserted in the first mode and wherein the pulse remains asserted in the second mode.

7. The circuit of claim 1, further comprising a resistor coupled between the source terminal of the first transistor and the ground node.

8. The circuit of claim 1, further comprising a current source coupled between the source terminal of the second transistor and the ground node.

9. The circuit of claim 1, further comprising a first light emitting diode (LED) having a cathode coupled to respective drain terminals of the third transistor and a fourth transistor.

10. The circuit of claim 9, further comprising:
    a plurality of LEDs including the first LED, wherein the plurality of LEDs is coupled in series; and
    a boost converter coupled to an anode of a last one of the plurality of LEDs coupled in series and configured to provide an operating voltage to the plurality of LEDs, wherein the plurality of LEDs is configured to turn on during operation in the first mode.

11. A method comprising:
    operating a light emitting diode (LED) driver circuit in a first mode, wherein operating in the first mode comprises:
        controlling first and second transistors responsive to a signal provided on an output of an amplifier, the amplifier receiving a reference voltage on a first input and a feedback signal on a second input;
        coupling a gate terminal of a third transistor to a ground node;
        alternately asserting and de-asserting a pulse;
        activating a fourth transistor responsive to assertion of the pulse and de-activating the fourth transistor responsive to de-assertion of the pulse;
        controlling a brightness of one or more LEDs based on a duty cycle of the pulse, the one or more LEDs being coupled to drain terminals of the third and fourth transistors;
    operating the LED driver circuit in a second mode, wherein operating in the second mode comprises:
        holding the pulse in an asserted state;
        providing the feedback signal from a source of the first transistor; and coupling a gate terminal of the third transistor to the output of amplifier to cause activation of the third transistor.

12. The method of claim 11, further comprising, during operation in the first mode, a first switch causing a source terminal of the first transistor to be coupled to the second input responsive to assertion of the pulse, and causing a source terminal of the second transistor to be coupled to the second input responsive to de-assertion of the pulse.

13. The method of claim 11, further comprising a second switch coupling a gate terminal of the third transistor to the ground node during operation in the first mode and further comprising the second switch coupling the gate terminal of the third transistor to the output of the amplifier when operating in the second mode.

14. The method of claim 11, further comprising varying an amount of current through the one or more LEDs when operating in the first mode, and causing a continuous current through the LEDs when operating in the second mode.

15. A system comprising:
a voltage regulator circuit configured to provide an output voltage based on a received input voltage;
a plurality of light emitting diodes (LEDs) coupled in series, wherein an anode of a first one of the plurality of LEDs is coupled to receive the output voltage; and
a driver circuit, wherein a cathode of a last one of the plurality of LEDs is coupled to a drive node of the driver circuit, wherein the driver circuit includes:
a first control loop including a first transistor configured to be activated when a pulse is asserted during operation in a first mode, wherein when active during operation in the first mode, the first transistor is configured to control an amount of current through the plurality of LEDs based in part on an amplifier output signal, the amplifier having a first input coupled to receive a reference voltage and a second input coupled to receive a first feedback signal from a source terminal of the first transistor when the pulse is asserted in the first mode; and
a second control loop including a second transistor, wherein during operation in the first mode, the second input of the amplifier is coupled to receive a second feedback signal from a source terminal of a second transistor when the pulse is de-asserted;
wherein during operation in a second mode, the second input of the amplifier is coupled to receive the first feedback signal responsive to the pulse remaining asserted.

16. The system as recited in claim 15, further comprising a third transistor, wherein the third transistor is configured to control an amount of current through the plurality of LEDs during operation in the second mode.

17. The system of claim 16, further comprising a second switch, wherein a gate terminal of the third transistor is coupled to receive the amplifier output signal via the second switch during operation in the second mode, and wherein the gate terminal of the third transistor is coupled to a ground node via the second switch during operation in the first mode.

18. The system of claim 16, further comprising a fourth transistor having a source terminal coupled to a drain terminal of the first transistor, and a drain terminal coupled to a drain terminal of the third transistor and the cathode of the last one of the plurality of LEDs, wherein the fourth transistor is configured to be active responsive assertion of the pulse and inactive responsive to de-assertion of the pulse.

19. The system of claim 16, wherein the first switch is configured to, during operation in the second mode:
couple the source terminal of the first transistor to the second input of the amplifier; and
decouple the source terminal of second transistor from the second input of the amplifier.

20. The system of claim 15, further comprising:
a resistor coupled between the source terminal of the first transistor and a ground node; and
a current source coupled between the source terminal of the second transistor and the ground node.

* * * * *